United States Patent [19]
Oertley

[11] Patent Number: 6,109,706
[45] Date of Patent: Aug. 29, 2000

[54] PIN AND BUSHING CONFIGURATION FOR A TRACK ASSEMBLY

[75] Inventor: Thomas E. Oertley, Dunlap, Ill.

[73] Assignee: Caterpillar, Inc., Peoria, Ill.

[21] Appl. No.: 09/193,603

[22] Filed: Nov. 17, 1998

[51] Int. Cl.[7] .................................................. B62D 55/21
[52] U.S. Cl. ............................. 305/202; 305/59; 305/42
[58] Field of Search .................................. 305/59, 41, 42, 305/200, 201, 202, 204, 102, 103, 104, 105, 106, 118

[56] References Cited

U.S. PATENT DOCUMENTS

| | | | |
|---|---|---|---|
| 1,684,918 | 9/1928 | Jereczek | 305/59 |
| 1,973,214 | 9/1934 | Lamb | 305/42 |
| 2,113,018 | 4/1938 | Fergusson | 305/42 |
| 2,145,623 | 1/1939 | Hill | 115/17 |
| 2,957,731 | 10/1960 | Backhaus | 305/41 |
| 3,313,578 | 4/1967 | Wright et al. | 305/57 |
| 3,362,759 | 1/1968 | Ley | 305/59 |
| 3,430,511 | 3/1969 | Bowditch | 74/469 |
| 3,721,476 | 3/1973 | Andersson | 305/35 |
| 4,136,913 | 1/1979 | Pietzsch et al. | 305/59 |
| 4,195,887 | 4/1980 | Ruddell | 305/42 |
| 4,572,588 | 2/1986 | Wiesner et al. | 305/59 |
| 4,732,492 | 3/1988 | Bonfils | 384/129 |
| 4,892,365 | 1/1990 | Szakacs | 305/58 |
| 5,069,510 | 12/1991 | Cory | 305/58 |
| 5,749,634 | 5/1998 | Wiesner et al. | 305/42 |

*Primary Examiner*—S. Joseph Morano
*Assistant Examiner*—Long Bao Nguyen
*Attorney, Agent, or Firm*—William C. Perry

[57] ABSTRACT

In the operation of track-type machines, the pin and bushing assemblies incorporated in the track assemblies are typically lubricated to accommodate wear that occurs as they rotate relative to one another. Since the relative rotation occurs over a relatively small area, there are instances wherein portions of the interface between the pin and bushing never are exposed to the lubricating fluid, thus causing premature wear. The present invention provides a track assembly that has a track bushing that defines a bore that is defined by a plurality of wall segments. The wall segments join one another to define a plurality of cusps that form axially extending channels that extend the axial length of the bushing. The channels maintain a quantity of lubricant during relative rotation of the track pin and bushing to prevent premature wear.

17 Claims, 3 Drawing Sheets

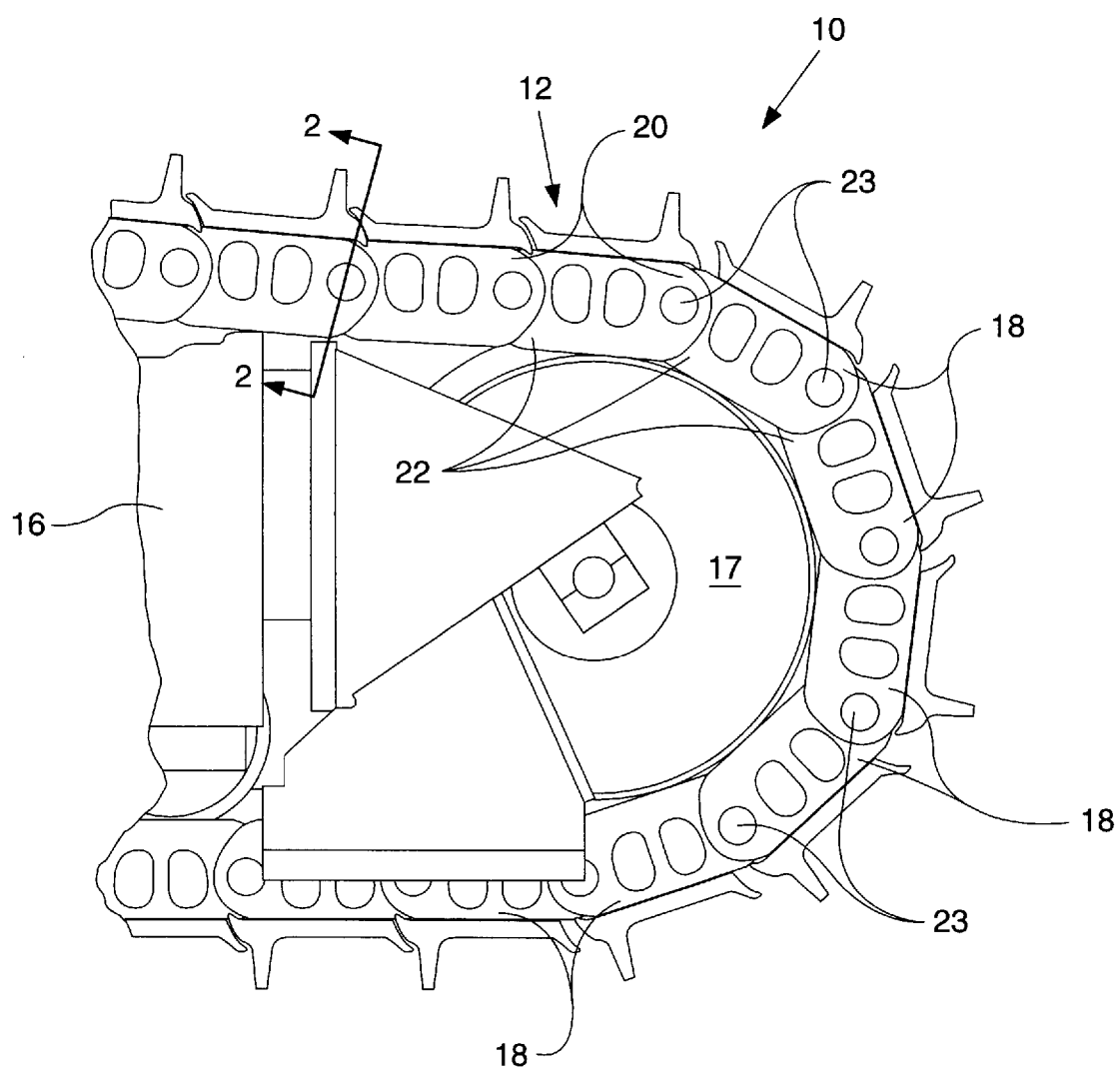

PIN AND BUSHING CONFIGURATION FOR A TRACK ASSEMBLY

TECHNICAL FIELD

This invention relates to a track assembly and more particularly to a track pin and bushing arrangement utilized in the track assembly.

BACKGROUND ART

In the operation of tracked machines, wear between the various components comprising a track assembly is a critical concern. Because the machine operates in extremely harsh conditions over all types of terrain, wear of the different components of the track assembly varies drastically.

One type of wear experienced in a track assembly is a phenomenon known as "galling" and has been known to occur, in particular, between the track pin and track bushing that interconnect the sides of the track chain to one another. In a typical track assembly, the track pins are connected to the end portions of a pair of parallel links, while the track bushings are connected to the opposite, but overlapping end portions of the parallel links. The track pins are received within a bore defined by the track bushings and the two components rotate relative to one another as the driven track chain rotates around the sprocket and idlers of the track assembly. In an attempt to control wear, a clearance is provided between the track pin and bushing in which lubricating fluid may reside that is contained in a reservoir defined by the track pin. As the track pin and bushing oscillate with respect to one another, the lubricant is intended to cover the interface between the two components and greatly reduce the "galling" that would otherwise occur therebetween.

The problem that exists, particularly in the track chains of extremely large machines, is the distribution, or lack thereof, of the lubricant to the area of interface between the track pin and bushing. Typically, the oscillation angle between the track pin and bushing is relatively small, generally about 30 degrees. The track pin and the bore of the bushing, in which the track pin resides, are known to be cylindrical in configuration. The diameter of the pin and the diameter of the bore are very nearly the same with the bore being slightly larger to provide a slight clearance therebetween for the lubricant. The load applied to the pin and bushing is distributed along the area of interface, or oscillation, and, unless the clearance is relatively large, this interface may never separate enough to be lubricated by the fluid present in the clearance. In these instances, the effect of the lubricant is minimal and galling will occur resulting in premature wear.

One solution to this situation is to increase the size of the clearance between the track pin the bore of the bushing to reduce the area of load distribution. This has been known to improve the galling between the pin and the bushing by allowing the flow of lubricant to the area of interface. The sealing arrangement, however, positioned between the track links and the track bushing to maintain the reservoir of lubricant within the track pin and the clearance is taxed. With an increase in clearance, the amount of relative movement between the track pin and bushing is also increased. The seal assemblies must accommodate this increase in relative movement and the amount of allowable increase in clearance is greatly limited by typical sealing systems. This has been known to cause premature failure of the track joint.

The present invention is directed to overcoming one or more of the problems as set forth above.

DISCLOSURE OF THE INVENTION

In one aspect of the present invention a track assembly is provided that includes first and second track chain portions, each of which includes a plurality of track link members. Each plurality of track link members has first and second end portions that are connected together in end-to-end relation to one another. The first and second plurality of track links are positioned adjacent one another in spaced, parallel relation to one another. A track pin member is connected between each of the respective first end portions of the first and second plurality of track links. A bushing member is included that extends between the each of the second end portions of the respective first and second plurality of link members and are positioned about the pin members. Each bushing member has a bore that extends axially therethrough, which is adapted to receive the respective track pins. The bore is defined by a plurality of axially extending wall segments.

In another aspect of the present invention, a track assembly is provided that includes a track chain defined by a first and second track chain portions that are defined by a plurality of track links. Each of the respective first and second plurality of track links are pinned together in end-to-end relation to one another and are laterally interconnected to each other in spaced, parallel relation to one another. The lateral interconnection between the respective plurality of links is provided by a plurality of track pins and track bushings that extend between the respective laterally adjacent pluralities of track links. The track pins and bushings are positioned along common axes with the pins being received within a bore defined by the track bushings. The bore is polygonal in configuration and is defined by a plurality of wall segments.

With a track assembly as described above, the segmented walls that comprise the bore of the track bushings form an angled cusp at the juncture between the wall segments. The cusps are spaced from the surface of the track pin in a manner to form a plurality of axially extending channels that run at least along the portions of the bushing that will interface with the track pin when subjected to loading. These channels are sufficient to carry fluid that will provide lubrication of the interface between the track pin and bushing, even during oscillation between the components.

BRIEF DESCRIPTION OF THE DRAWINGS

FIG. 1 is a diagrammatic side elevational view of a portion of a track assembly of a track-type machine that embodies the principles of the present invention;

BEST MODE FOR CARRYING OUT THE INVENTION

Figure 2:
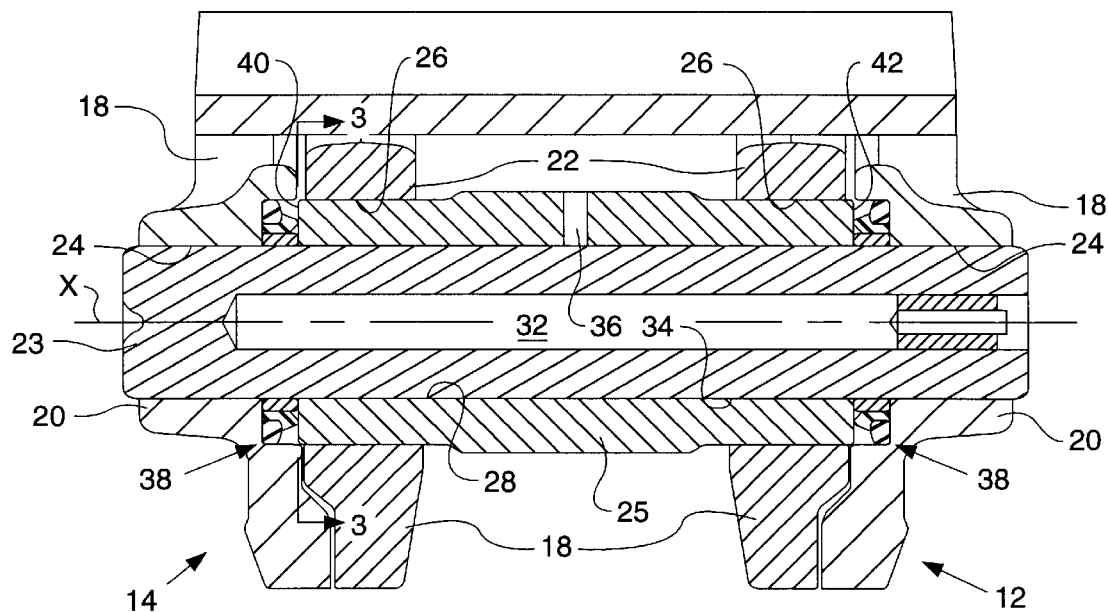
FIG. 2 is a diagrammatic cross-sectional view of the track assembly taken along lines 2—2 of FIG. 1.

Referring now to the drawings, it can be seen that a portion of a track assembly for a track-type machine is shown generally at 10. The track assembly 10 includes a pair of endless track chain portions 12 and 14 that are positioned in spaced parallel relation to one another and are entrained about a track roller frame 16 of the machine. The track assembly engages a drive sprocket (not shown) that provides motive force to the track assembly, which in turn, drives the machine in a well known manner. The track is also entrained about at least one idler member 17 that rotatably supports the track assembly on one end of the track roller frame as viewed in FIG. 1.

Each of the chain portions 12 and 14 are comprised of individual track links 18 that have first and second end portions 20 and 22 respectively. The individual track links are pinned together in end-to-end relation with one another to form the respective continuous chain portions. Each chain portion is positioned in spaced, parallel relation to one another with the respective track links in lateral alignment with one another in a well-known manner.

In a preferred embodiment of the present invention shown in FIG. 2, it can be seen that the track chain portions 12 and 14 are interconnected by laterally extending track pins 23. The track pins 23 are engaged, by press fit or any other suitable fastening means, with a bore 24 defined by laterally opposed first end portions 20 of the track links 18 of the first and second chain portions. A plurality of track bushings 25 are likewise interconnected between the laterally opposed second end portions 22 of the track links of the first and second chain portions. The track bushings are received within a bore 26 defined by the second end portions of the respective track links and are secured therein by press fit or other suitable means. The second end portions 22 of the track links are offset from the first end portions 20 so as to be in lateral alignment with the first portions of the adjacent links, as can be seen in FIG. 2. This positioning places bores 24 and 26 of the respective first and second end portions of adjacent track links in alignment with one another along a common, laterally extending axis X, as are the track pins 23 and bushings 25.

The track bushings 25 define a bore 28 in which the track pins 23 are positioned. The bore 28 is of sufficient size to establish a clearance between it and the track pin. The clearance allows the pin and bushing to rotate relative to one another as the track chain portions revolve around the idlers and sprocket supported by the track roller frame. The clearance also permits lubricating fluid, from a reservoir 32 defined in the track pin (FIG. 2), to coat the outer surface 34 of the track pin so that the interface between the track pin and the bore 28 of the bushing is lubricated to reduce wear therebetween. Typically, the fluid is communicated via one or more radially directed passage 36 that extends between the reservoir 32 and the outer surface 34 of the track pin. A pair of track seal assemblies 38 are positioned to engage opposing end faces 40 and 42 of the bushing to maintain the lubricating fluid within the reservoir and the clearance.

Figure 3:
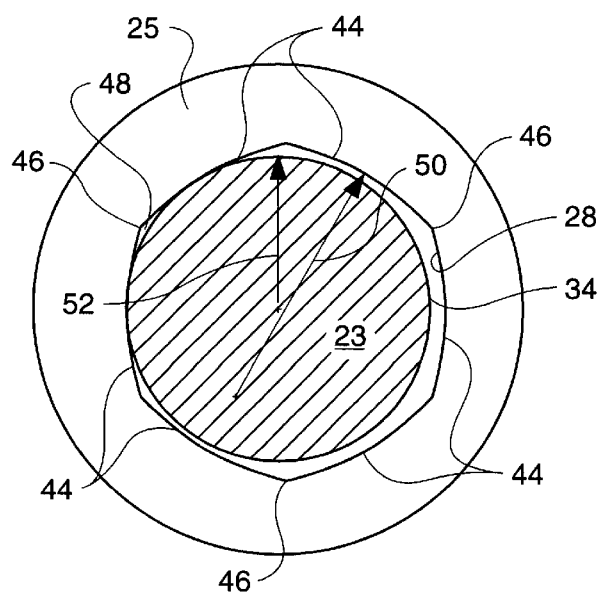
FIG. 3 is a diagrammatic end view of the track bushing taken along lines 3—3 of FIG. 2.

Referring to FIG. 3, it can be seen that the bore 28 of the track bushing 25 is configured such to define a series of wall segments 44 about its circumference. The wall segments 44 join one another to form a plurality of cusps 46 that are spaced a slight distance from the outer surface 34 of the track pin 23. The cusps define a plurality of axially extending channels 48 (FIG. 3) that extend the length of the track bushing. The wall segments 44 are arcuate in configuration and are struck from a center point that is positioned radially inwardly with respect to the bore 28. In the illustrated embodiment, it can be seen that the length of the radius 50 is larger than the radius 52 of the track pin but smaller that the diameter thereof. Preferably, the radius is within a range of 1.5 to 1.9 times the length of the track pin radius. While the illustrated radius is shown to be a preferred length, it is to be understood that radii of varying length, struck from alternate center points, even from a point outwardly from the bore, are also envisioned without departing from the intent of the present invention. The bore 28 is sized such that the amount of clearance between the bore and the track pin falls within a range of approximately 0.15 to 4 millimeters with a preferred clearance of approximately 0.2 millimeters.

Figure 4:
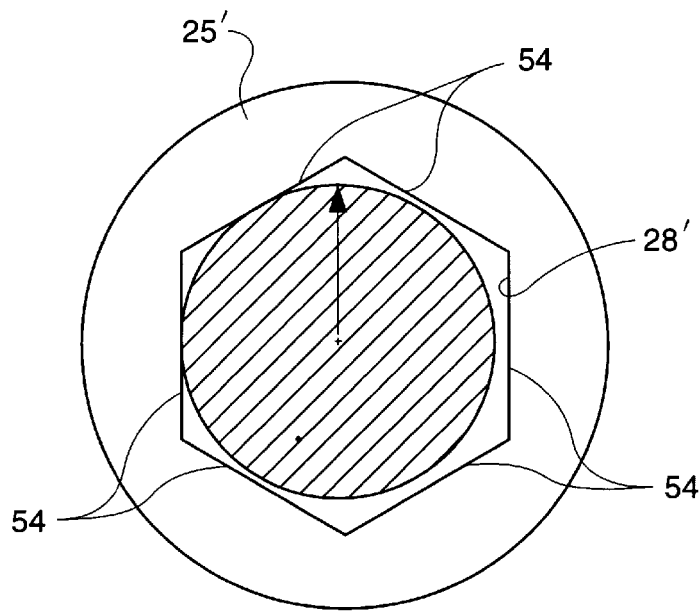
FIG. 4 is a diagrammatic end view, similar to that of FIG. 3 showing an alternate embodiment of the present invention.

An alternate embodiment of the invention is shown in FIG. 4. The track bushing 25' is shown to have a bore 28' whose circumference is configured in the shape of a polygon having a plurality of planar wall segments 54. While shown having six planar wall segments, it is to be understood that there could be any number of wall segments, with a preferable number that falls within a range of 6 to 24.

Figure 5:
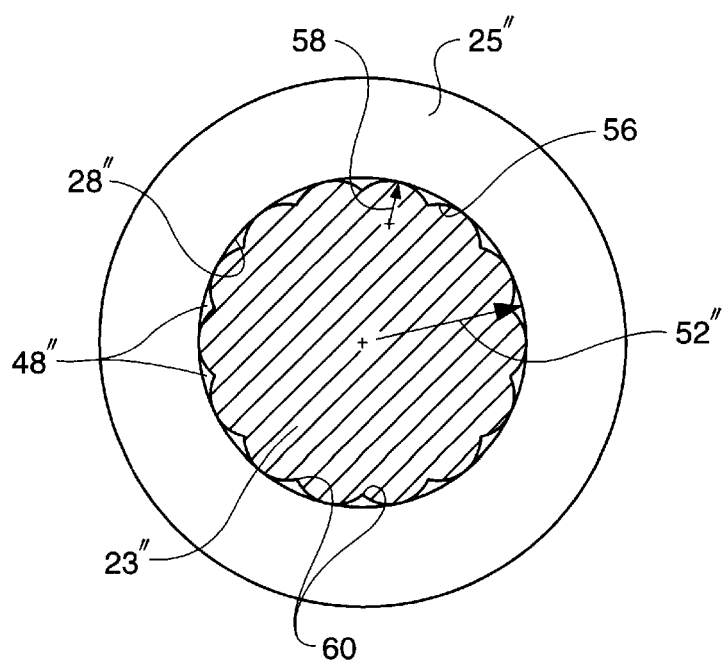
FIG. 5 is a diagrammatic end view, similar to that of Fig r showing an alternate embodiment of the present invention.

In another alternate embodiment shown in FIG. 5, it can be seen that the bore 28" of the track bushing 25" is generally round in configuration and the profile of the track pin 23" is segmented. The segments 56 are defined by a plurality of radii 58 that are substantially less in length than the radius 52" of the pin. The juncture between the segments defines an inwardly directed cusp 60 that forms a clearance with respect to the bore 28". This functions in an identical manner as the cusps 46 defined by the bushing 25 in providing a channel 48" in which lubricating fluid may be directed to all surfaces of the track pins and bushings.

INDUSTRIAL APPLICABILITY

During operation of a track-type machine, the track assembly 10 is driven around the sprockets and idler assemblies to power the machine. As the track links 18 move around these components, idler 17 for example, they are forced to rotate with respect to one another. In order to accommodate this relative rotation, a clearance is provided between the track pins 23 and track bushings 25 that laterally interconnect the chain portions 12 and 14 of the track assembly.

As relative rotation occurs between the track pin 23 and the track bushing 25, lubricating fluid is communicated to the outer surface 34 of the track pin from the reservoir 32 via passage 36. Since the bore 28 of the bushing is defined by wall segments, the cusp 46 defined therebetween, is spaced from contact with the outer surface 34 of the track pin. This defines an axially extending channel 48 in which lubricating fluid is maintained even in the area of interface between the pin and bushing. With the lubrication being present in all areas of the clearance, wear that is typically experienced in the area of pin/bushing interface, is greatly reduced.

Other aspects, objects and advantages of this invention can be obtained from a study of the drawings, the disclosure and the appended claims.

What is claimed is:

1. A track assembly, comprising:
   a first chain portion having a plurality of link members having first and second end portions and being connected together in end-to-end relation to one another;
   a second chain portion having a plurality of link members having first and second end portions and being connected together in end-to-end relation to one another and being positioned in spaced, parallel relation to the first plurality of link members;
   a pin member connected to and extending between the respective first end portions of the respective first and second plurality of link members;
   a bushing member having a bore extending therethrough, said bore being defined by a plurality of axially extending wall segments, said bushing being connected to and extending between the respective second end portions of the respective first and second plurality of link members with the pin member positioned within said bore.

2. The track assembly as set forth in claim 1 wherein the pin member and the bushing member rotate relative to one another.

3. The track assembly as set forth in claim 1 wherein the bore of the bushing member is has a polygonal configuration.

4. The track assembly as set forth in claim 3 wherein the wall segments defined by the bore are generally arcuate in a circumferential direction about the bore.

5. The track assembly as set forth in claim 4 wherein the intersection between adjacent wall segments is radially spaced from an outer surface of the pin member and forms an axially extending channel that extends the length of the interface between the pin member and the bushing member.

6. The track assembly as set forth in claim 5 wherein a lubricating fluid is contained within a reservoir defined in the track pin and is communicated to the axially extending channels in the region of interface between the pin member and bushing member.

7. The track assembly as set forth in claim 3 wherein the polygonal shape of the bushing bore includes a plurality of side portions that range in number from 6 to 24 side portions.

8. The track assembly as set forth in claim 4 wherein the arcuate wall segments have a radius that is struck from a point that is positioned on the inboard side of the bore has a length that is greater than the radius of the pin member.

9. In a track assembly having a track chain defined by a first chain portion defined by a plurality of track links pinned together in end-to-end relation to one another, and a second chain portion defined by plurality of track links pinned together in end-to-end relation to one another and being interconnected to the first plurality of track links in spaced, parallel relation thereto by a plurality of track pins and track bushings that extend laterally between the respective track links of the first and second chain portions, the improvement comprising:

a bore defined by the respective track bushings adapted to receive the respective track pins for relative rotation with respect thereto, said bore having a polygonal configuration defined by a plurality of wall segments.

10. The improvement as set forth in claim 9 wherein the polygonal configuration of the bore is defined by a plurality of arcuate wall segments.

11. The improvement as set forth in claim 10 wherein the juncture between the individual wall segments define a plurality of cusps that form axially extending channels that extend the length of the bushing member.

12. The improvement as set forth in claim 10 wherein the arcuate wall segments are defined by a radius that is larger than the radius of the track pin.

13. The improvement as set forth in claim 9 wherein the polygonal configuration of the bore is defined by a plurality of planar wall segments.

14. The improvement as set forth in claim 9 wherein a clearance between the bore of each track bushing and track pin is provided, said clearance is approximately 0.2 millimeters.

15. A track assembly, comprising:

a first chain portion having a plurality of link members having first and second end portions and being connected together in end-to-end relation to one another;

a second chain portion having a plurality of link members having first and second end portions and being connected together in end-to-end relation to one another and being positioned in spaced, parallel relation to the first plurality of link members;

a bushing member having a bore extending therethrough and being connected to and extending between the respective second end portions of the respective first and second plurality of link members; and a pin member connected to and extending between the respective first end portions of the respective first and second plurality of link members and being adapted for positioning with the bore defined by the track bushings, said pin member having an outer surface defined by a plurality of arcuate segments.

16. The track assembly as set forth in claim 15 wherein the segments defining the outer surface of the track pin are defined by a radius that is less than that of the radius of the pin.

17. The track assembly as set forth in claim 15 wherein the juncture between the arcuate segments defines an inwardly directed cusp that is spaced from the bore to define an axially directed channel therebetween.

* * * * *